United States Patent [19]

Buckenmaier

[11] Patent Number: 5,388,074

[45] Date of Patent: Feb. 7, 1995

[54] FIFO MEMORY USING SINGLE OUTPUT REGISTER

[75] Inventor: Karl C. Buckenmaier, Somerville, Mass.

[73] Assignee: VLSI Technology, Inc., San Jose, Calif.

[21] Appl. No.: 992,337

[22] Filed: Dec. 17, 1992

[51] Int. Cl.⁶ .............................................. G11C 7/00
[52] U.S. Cl. ................................ 365/189.05; 365/221; 365/239; 365/240
[58] Field of Search ............... 365/221, 239, 240, 241, 365/189.05, 168, 189.01, 189.04, 189.12

[56] References Cited

U.S. PATENT DOCUMENTS

| | | | |
|---|---|---|---|
| 4,222,102 | 9/1980 | Jansen et al. | 365/239 |
| 4,616,338 | 10/1986 | Helen et al. | 364/900 |
| 4,733,376 | 3/1988 | Ogawa | 365/221 |
| 4,823,321 | 4/1989 | Aoyama | 365/221 |
| 4,888,741 | 12/1989 | Malinowski | 365/230.05 |
| 4,899,307 | 2/1990 | Lenoski | 365/78 |
| 5,122,988 | 6/1992 | Graeve | 365/219 |
| 5,198,999 | 3/1993 | Abe et al. | 365/189.05 |
| 5,228,002 | 7/1993 | Huang | 365/221 |
| 5,272,675 | 12/1993 | Kobayashi | 365/221 |
| 5,274,600 | 12/1993 | Ward et al. | 365/221 |
| 5,305,253 | 4/1994 | Ward | 365/73 |

FOREIGN PATENT DOCUMENTS 61-136400  6/1986  Japan .................................. 365/221

*Primary Examiner*—Eugene R. LaRoche
*Assistant Examiner*—Andrew Q. Tran
*Attorney, Agent, or Firm*—Patrick T. King

[57] ABSTRACT

A FIFO memory circuit with improved read-access time includes an output register, which is connected to the data output terminal of the FIFO. The output register is clocked to provide the output of the FIFO with only the clock-to-output delay of the register. The FIFO memory circuit is formed with a series of latches, each of which latch has a data-input terminal connected in parallel to the data input terminal of the FIFO. Each latch has a tri-state output which is connected to an output terminal for the FIFO. Write-pointers select the next-available one of the FIFO locations to be read into. Read pointers select the next FIFO location to be read from. An input storage register is also provided to improve the input access time of the FIFO.

6 Claims, 5 Drawing Sheets

FIFO MEMORY USING SINGLE OUTPUT REGISTER

BACKGROUND OF THE INVENTION

1. Field of the Invention

This invention relates to memory circuits and, more particularly, to improved first-in/first-out FIFO memory circuits.

2. Prior Art

A FIFO memory circuit is a data storage device which allows data information to be written into data-storage locations at a write-data rate. The data is read out of the data-storage locations at a read-data rate. A FIFO is arranged so that he data which is first written into the storage device is read out of the storage first, hence, the name FIFO. FIFO memories are often provided as semiconductor integrated-circuit devices. A FIFO is similar to a shift register because data enters and exits the device in the same order. However, from a circuit configuration point of view, there are some differences.

In a shift register, the data information is transferred from memory cell to memory cell so that the data information bits are not stored in a particular memory location., that is, data is serially "pushed" through a connected string of various memory cells. In a shift register, the memory cells are arranged in a string so that the data-output terminal of a first memory cell is connected to the data-input terminal of an adjacent cell. Sometimes, only the input terminal of the first memory cell in the string is externally available and only the output cell of the last memory cell in the string is externally available.

In a FIFO, each bit of data information is stored in a particular memory cell. In a FIFO the input terminals and the output terminals of each cell are externally available for writing data information directly into the next available cell and for reading data information directly out of the memory cell with the "oldest", or first-written, data information. In this sense, a FIFO memory is a more complex system than a shift register. In a FIFO, a read-address pointer keeps track of the address of the first-written information and a write-address pointer keeps track of the next available memory location into which the next information is to be written. The data for a particular FIFO cell goes directly into a memory cell from the input terminal of the FIFO. Data from the memory cell goes directly to the output terminal of the FIFO memory without being serially transferred from cell to cell. Reading and writing of data with a FIFO can be controlled by separate clock signals.

FIFO memory circuits are commonly used to buffer asynchronous data where the recipient of the data is sometimes unable to immediately receive or handle incoming data. For example, a FIFO memory could be used to buffer, or temporarily store, asynchronous input information from a keyboard for a computer system. Using a FIFO memory, if the computer system is not ready to accept keyboard information as it is generated in real time from the keyboard, the FIFO memory records the asynchronous keyboard information in the order that it was received and makes that keyboard information immediately available at any subsequent time that the computer system is ready to accept keyboard information.

A useful mechanical analogy to a FIFO memory is a coin-handling mechanism for a coin-operated vending-machine. In this analogy, a coin in the coin-holding mechanism of the vending machine is analogous to a data information bit stored in a FIFO memory location. Coins inserted by a user and stored in the coin-holding mechanism can be diverted to a coin-return slot (analogous to the data-output terminal of the FIFO) and asynchronously returned to the user by the user making a request for a return of the coin, prior to the user entering his or her selection into the vending machine. The time required for coins to fall from the coin-holding mechanism to the coin-return slot, or output, is analogous to the "read access delay time" of a FIFO memory device.

Typically, a FIFO memory includes an array of latches which have all of their their input terminals connected in parallel. The output terminals are also connected in parallel using, for example, tri-state output devices. Write-pointer logic is provided for addressing the next available memory location into which information can be written. Read-pointer logic is provided for addressing the memory location which has the earliest time of storage and which is to be read first. Status flags are provided to indicate the status of the FIFO memory, for example, full, half-full, or empty. In a typical FIFO, the FIFO-access time is the sum of the delays for the pointer-logic and the latch-array, that is, the elapsed time between initiation of a system read or write control trigger signal and the completion of a read or write operation.

Previously, efforts to improve the access time of a FIFO memory system have been focused on decreasing the circuit time-delays in both the pointer logic circuits and the latch memory arrays by using improved semiconductor integrated-circuit processing techniques and process technologies to provide faster individual circuit elements of the FIFO memory system.

A need exists for improving the operating speed of a FIFO memory system in order to reduce overall access time to the FIFO. At the same time, it is desireable that no major changes be made to the circuit designs of the circuit elements of the memory system or to the support circuitry used with a conventional FIFO memory system.

SUMMARY OF THE INVENTION

It is therefore an object of the invention to provide a technique for improving the access time for a FIFO memory system.

In accordance with this and other objects of the invention, an improved FIFO memory system is provided according to the invention. A FIFO memory system includes data storage means, data addressing means, means for controlling the memory system, and means for monitoring the status of the memory. The improved FIFO memory system includes an additional register circuit, either at the input or output of the FIFO to provide a means for buffering data and for reducing access time between the FIFO memory circuit and external data terminals.

The data storage means includes a number of memory cells, such as latch cells, which have parallel-connected input terminals and parallel-connected output terminals. The data storage means also includes data-control terminals. The data addressing means includes a write-pointer logic system and a read-pointer logic system.

For reading data out of the improved FIFO, an output register has its input data terminals connected to the data output terminals of the data storage means. For writing data into the FIFO, an input register has its output data terminals connected to the data input terminals of the data storage means.

An advantage of the invention is that the latch delays and the read-pointer delays are eliminated from the data path so that the FIFO can be read much faster.

A FIFO memory circuit according to the invention includes a data-storage means for storing data information in a group of memory locations, such as provided, for example, by a series of parallel-connected latches. Write-pointer logic provides an address for selecting the next-available one of the memory locations, or latches, into which the next available data is to be written. Read-pointer logic provides an address signal to a predetermined memory location, or latch, of the FIFO to thereby provide data stored in the predetermined memory location at the data output terminal of the FIFO. In accordance with the invention, an output register is connected to the output terminal of the FIFO latches to improve read operation. An input register is connected to the input terminal of the FIFO latches to improve read operation. A clock terminal of the output register receives a read clock signal for transferring the first-in data provided from the latch, or data storage means, selected by the read-pointer logic means to the output terminal of the output register.

In one specific embodiment of the invention, the FIFO memory circuit is formed of a series of latches, where each latch has a data-input terminal connected in parallel to a data input terminal of the FIFO. Each of the latches has a tri-state data-output terminal connected to the FIFO data output terminal. Each of the latches has an input enable terminal for transferring input data from the data input terminal to the tri-state data output terminal.

In another embodiment of the invention, an input register has its output terminal connected to the input terminals of the latch.

The FIFO memory circuit includes logic means for indicating the availability of storage locations within the FIFO using full and empty status flags.

Using an output register for a FIFO array according to the invention has a number of advantages, in addition to improved access time. Because the output register can be a flip-flop circuit, the data output signal remains valid until another read request is received. The output data is completely stable for the entire time duratiuon between read requests. The output data changes only for a brief instant during the read request pulse. The read pointer can be incremented at the same time that the output register is clocked. Depending upon other timing constraints, the read pointer can be formed of a counter and a decoder because there is no requirement that the read pointer signal be glitch free at all times.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
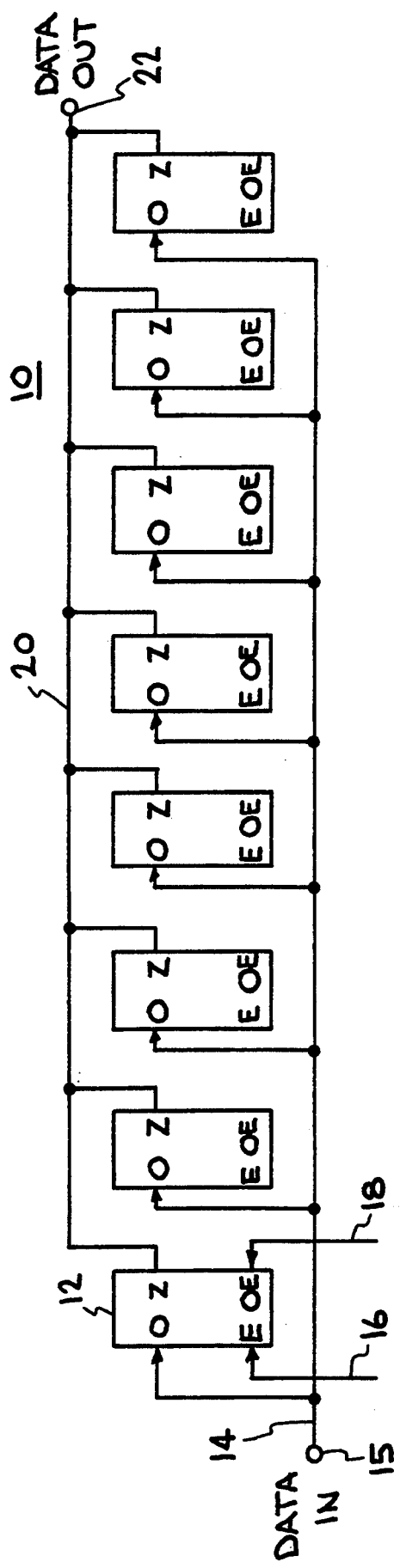
FIG. 1 is a prior art simplified block diagram of a conventional FIFO memory configuration using a series of latches having their input terminals and their output terminals connected in parallel.

FIG. 1 shows a prior art simplified block diagram of an example of a conventional FIFO memory configuration 10. In this simple example of a FIFO configuration, an array of eight latches is provided for storing up to eight bits of data information. As exemplified by a typical latch structure 12 of the array, each latch has a data input terminal O, which is connected to a data-in signal line 14 for the array, where all of the respective data input terminals O of the latches in the array have their input terminals connected in parallel. The data in signal line 14 is connected to a data-in input terminal 15 for the array 10.

Data is selectively stored, or written into, the latch 12 when a write-pointer signal is provided at a write-enable terminal E of the latch 12. Using the first latch 12 as an example for illustration purposes, a write-pointer signal is provided on a signal line 16 from a write-pointer logic circuit, not shown, which selects the next appropriate latch location to store data.

Data is selectively read from the latch 12 when a read-pointer signal is provided to a read-enable terminal OE of the latch 12. Again using the first latch 12 as an example for illustration purposes, the read-pointer signal is provided on a signal line 18 from a read-pointer logic circuit, not shown, which selects the tri-state output terminal Z to provide output data to the data output signal line 20. The data output signal line 20 is connected to an output terminal 22 for the array 10. Typical time delays between the time that the signal at terminal OE goes high to data appearing at output terminal Z is 10 nanoseconds.

Figure 2:
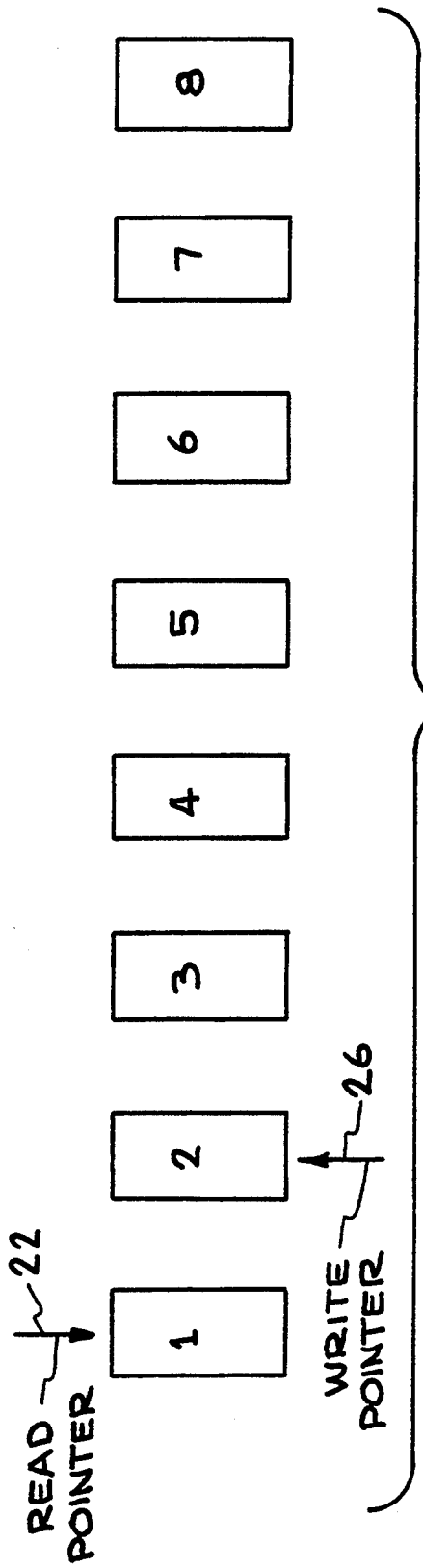
FIG. 2 is a prior art diagram illustrating initialization of the read and write pointers for the configuration of FIG. 1.

FIG. 2 is a prior art diagram illustrating the initialization of the read and write pointers for the configuration of FIG. 1. The read pointer, represented by an arrow 22 points to the first stage. The write pointer, represented by the arrow 24, points to the second stage. The write-pointer logic circuit and the read-pointer logic circuits independently select the appropriate latch locations into which the last-in data is written and out of which the first-in data is read. These logic circuits typically are formed from a shift registers or counters with output decoder logic. The logic circuits keep track of the location from which the oldest data stored in the array is to be read. The logic circuits also keep track of the next available location into which new input data is to be written into the array.

In FIG. 2, data has been written into the first shift register 1. The read pointer is shown as a selection arrow 22 pointing to shift register 1. After shift register 1 is written into, the write pointer points to shift register 2, as indicated by the selection arrow 26. After the next read or write request, the write pointer is moved to point to the next available shift register. In this manner, the write pointer is moved shortly after a read or write request. This arrangement functions as long as enough setup time is provided for input data to be writen to a location before the write pointer is changed. The read pointer can change as soon as a read request is received. In the simplified system represented by FIGS. 1 and 2, the full and empty conditions of the latch array are not considered. Typically, logic is provided to indicate full and empty conditions and to deal with these conditions, as required.

Figure 3:
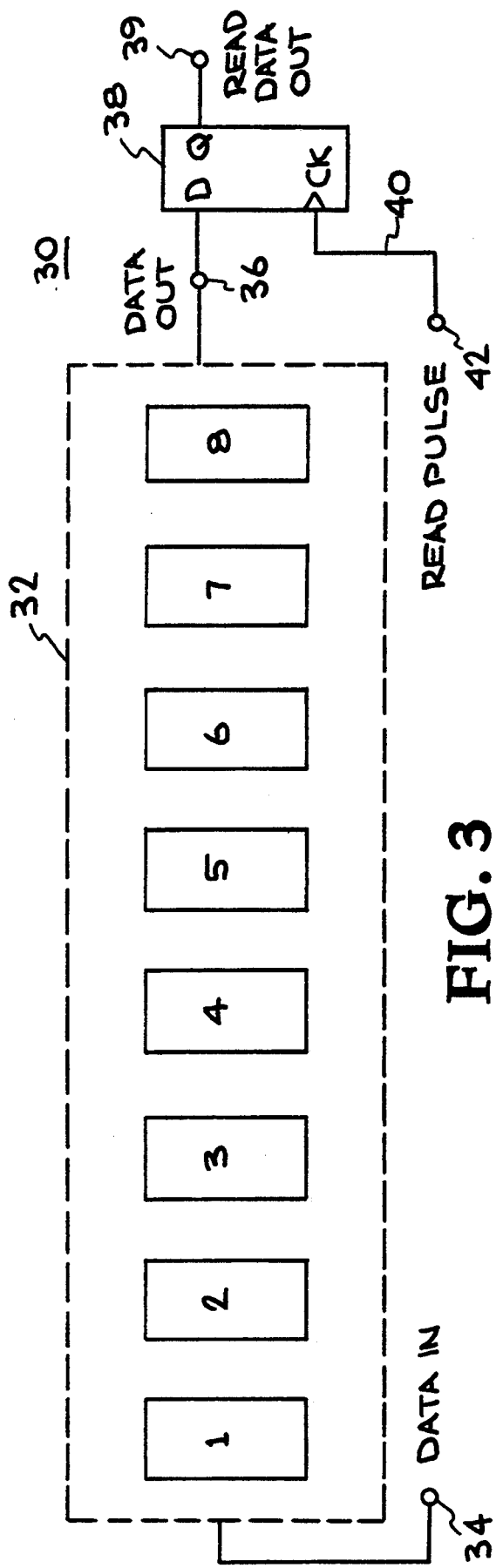
FIG. 3 is a simplified block diagram illustrating a FIFO memory circuit formed as a series of latches, where a shift register is connected to the parallel-connected data output terminals of the latches, according to the invention.

FIG. 3 shows a simplified block diagram of an improved FIFO memory latch-array configuration 30, according to the invention. This configuration includes an array of diagrammatically represented latches, similar to the array 10 of FIG. 1, with a common data input terminal 34 and a common data output terminal 36, as shown in the Figure. However, an additional output register 38 is connected to the data out terminal 36 to provide for increased speed of operation, as described hereinbelow. The output register 38 is implemented, for example, as a D flip-flop circuit, which has a D input terminal connected to the data out terminal 36 of the latch array 32. A CK clock terminal is connected through a signal line 40 to a read-pulse terminal 42. Data is validly transferred from the D input to a Q read-data output terminal 39 within 2 nanoseconds after a positive-going edge of a read pulse is provided at the read-pulse terminal 42.

As will be described hereinbelow, the FIFO memory latch-array configuration 30 is provided with an empty flag signal E when the FIFO contains no valid data. When the empty flag signal is asserted, the FIFO cannot be read. Similarly, a full flag signal F indicates that the FIFO memory cannot be written into.

Figure 4:
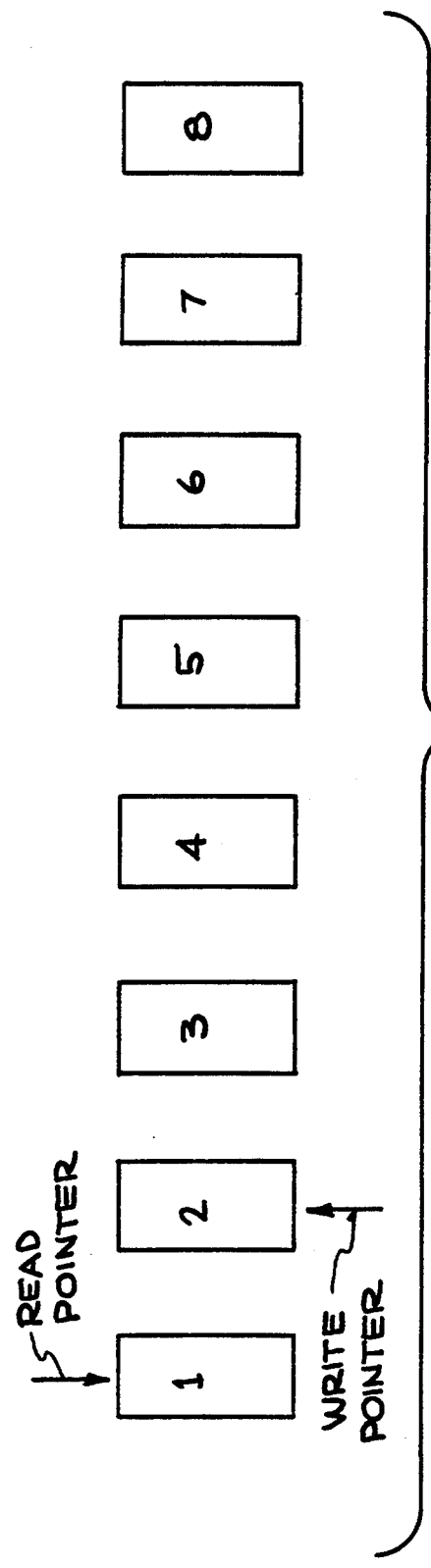
FIG. 4 is a diagram illustrating the positions of the read and write pointers for the configuration of FIG. 3 subsequent to data being written into the first latch of the FIFO memory circuit.

FIG. 4 is a diagram which illustrates the positions, or address values, of the read pointer and the write pointer for the configuration of FIG. 3. If, after initialization, a write request takes place and data is written into memory location 1, the write pointer will be at memory location 2, as indicated in the Figure. The read pointer is already pointing to the location to be read, that is, location 1. In effect, the read pointer is looking ahead. All that is required to read location 1 is for a read pulse to be applied to terminal 42 of FIG. 3.

The register, or D flip-flop 38, acts as an output buffer register to provide output data to the read-data output terminal 39 within 2 nanoseconds of receiving a read pulse at terminal 42. To provide proper operation of this system, all that is necessary is that the output signal of the FIFO array be valid before a read is attempted. This is achieved by controlling the delay in asserting or de-asserting the empty flag, as well as controlling the delay of the various clock signals used, as required.

With the arrangement 30 according to the invention, the access time of the system is 2 nanoseconds, that is, the delay time of the flip-flop register 38. The cycle time of the system is the access time of the FIFO block (10 nanoseconds) plus the setup time of the flip-flop register 38. The access time delay of the system shown in FIG. 1 is 10 nanoseconds and the cycle time delay of the system shown in FIG. 1 is 10 nanoseconds. Using the the additional register 38 significantly reduces the overall access time of such a system.

Use of the output register 38 has other advantages. Because a flip-flop register is used, the data output of the system at terminal 39 remains valid until another read-request pulse is is received by the system at terminal 42. The output data at the read-data output terminal 39 of the output register 38 remains completely stable for the entire time between read request pulses. Output data is only in a transition mode only for the brief instant that the output data changes in response to a read-pulse signal at terminal 42.

This arrangement also permits the read pointer logic, which is, for example, a shift register, to be incremented at the same time that a read clock pulse is provided to the flip-flop register 38. Depending upon various timing signal requirements, this arrangement according to the invention also permits the read pointer logic to be implemented as a counter plus an output-decoder because the system according to the invention does not require the read pointer signal to be free of glitches, such as are produced with a counter and decoding-logic gates.

Because the output flip-flop register 38 can be clocked at the same time as the read-pointer logic, the access time is even further decreased because the delay through the read-pointer logic is not a factor to be accounted for.

Figure 5:
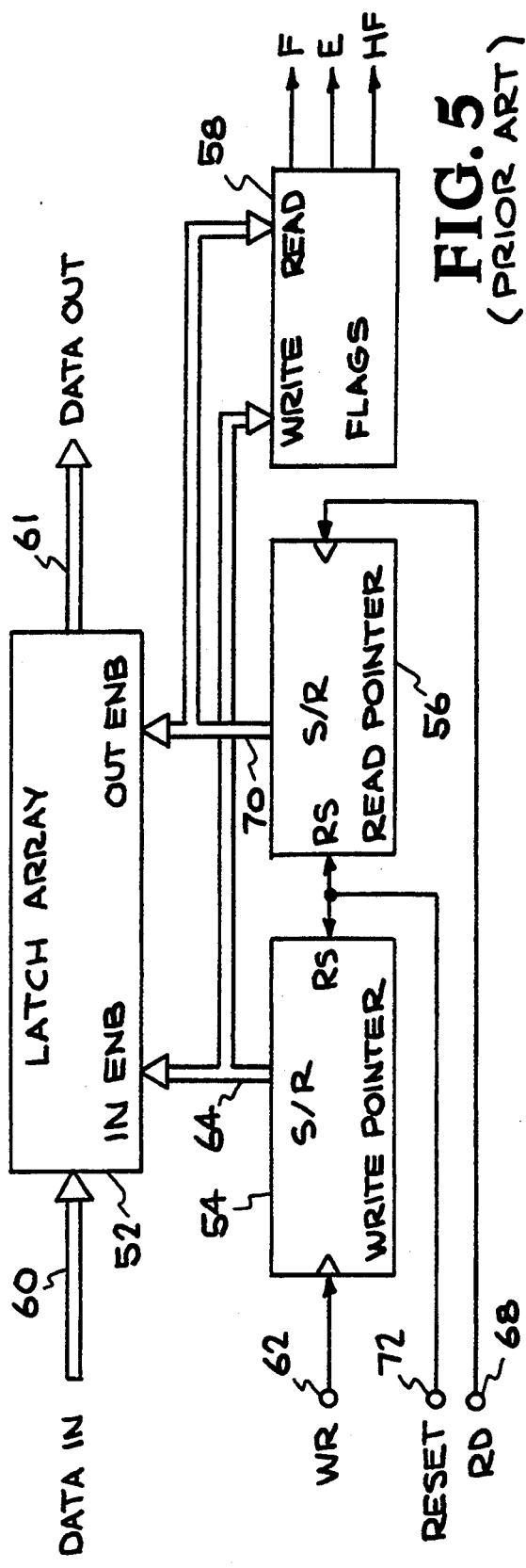
FIG. 5 is a block diagram of a prior art FIFO memory circuit having a memory latch-array, a write-pointer logic circuit, a read-pointer logic circuit, and a flag logic circuit.

FIG. 5 is a block diagram of a conventional n-bit wide FIFO memory system 50. A one-bit path is shown in the Figure, with the remaining n-1 paths similarly configured. The system includes a memory latch-array 52, a write-pointer logic circuit 54, a read-pointer logic circuit 56, and a flag logic circuit 58.

The memory latch-array 52 is for temporarily storing a series of n-bit wide data words, where each bit of the n-bit wide data words is stored in a latch array 10 such as illustrated in FIG. 1. N-bit wide input words are provided to the input terminals of the n-bit wide latch array 52 using a n-bit wide data bus 60. Output data is provided on an n-bit wide output data bus 62.

The write-pointer logic circuit 54 receives a write command WR signal at an input terminal 62. Write pointers, or address signals, pointing to a location in the latch array 52, are provided from the write pointer logic circuit 54 on one branch of a signal bus 64. The one branch of the signal bus 64 is connected to the write-enable terminals IN ENB of the latch array 52 to select the storage location for storage of an input data word. The write pointers from the write-pointer logic circuit 54 are also provided on another branch of the signal bus 64 to the write input terminals of the flag logic circuit 58.

Similarly, the read-pointer logic circuit 56 receives a read command RD signal on a signal line 66 from an input terminal 68. Read pointers, or address signals pointing to a location in the latch array 52, are provided from the read pointer logic circuit 56 on one branch of a signal bus 70 which is connected to the read-enable terminals OUT ENB of the latch array 52 to select the storage location for reading out a data word to the n-bit wide output data bus 62. The read pointers from the read-pointer logic circuit 56 are also provided on another branch of the signal bus 70 to the read input terminals of the flag logic circuit 58.

The flag logic circuit 58 receives the write and read pointer signals on the respective buses 64, 70 and provides logic output signals for full, empty E, and half-full HF conditions of the latch array 52. The write-pointer logic 54 and the read-pointer logic 56 have reset terminals RS which receive a reset signal from a reset terminal 72 to reset the pointers to their initial values, indicating an empty latch array 52.

Figure 6:
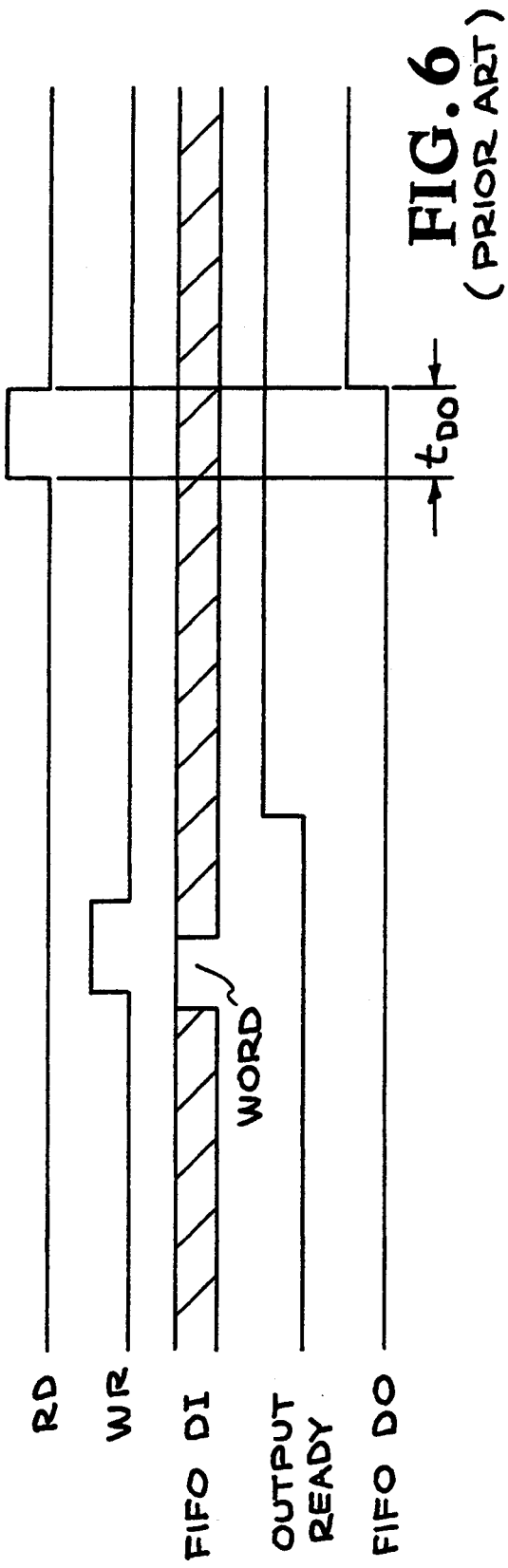
FIG. 6 is a timing chart for the prior art FIFO memory circuit of FIG. 5.

FIG. 6 is a timing chart for the conventional FIFO memory system of FIG. 5. For a read operation, the leading edge of the read command RD signal activates the read pointer logic circuit 56 to provide a read pointer address signal on the bus 70. The proper memory locations are addressed by that pointer address signal and the data out FIFO DO signals appear on the n-bit wide output data bus 62 after a time delay $t_{DO}$. The time delay is the sum of the delays through the read-pointer logic 56 and the latch array 52. For example, for the typical delays mentioned in connection with the discussion of FIG. 1, the delay time is 20 nanoseconds.

For a write operation, FIG. 6 shows a write command WR signal which is provided to the write-pointer logic 54. Data input values FIFO DI are provided on the data input bus 60. The data is written into the latch array 52 and is ready at the latch output after the OUTPUT READY signal goes to a high state as indicated in FIG. 6. The delay is equal to the time required to activate the write-pointer logic 54 and the time to latch the data input signal into the latch array 52.

Figure 7:
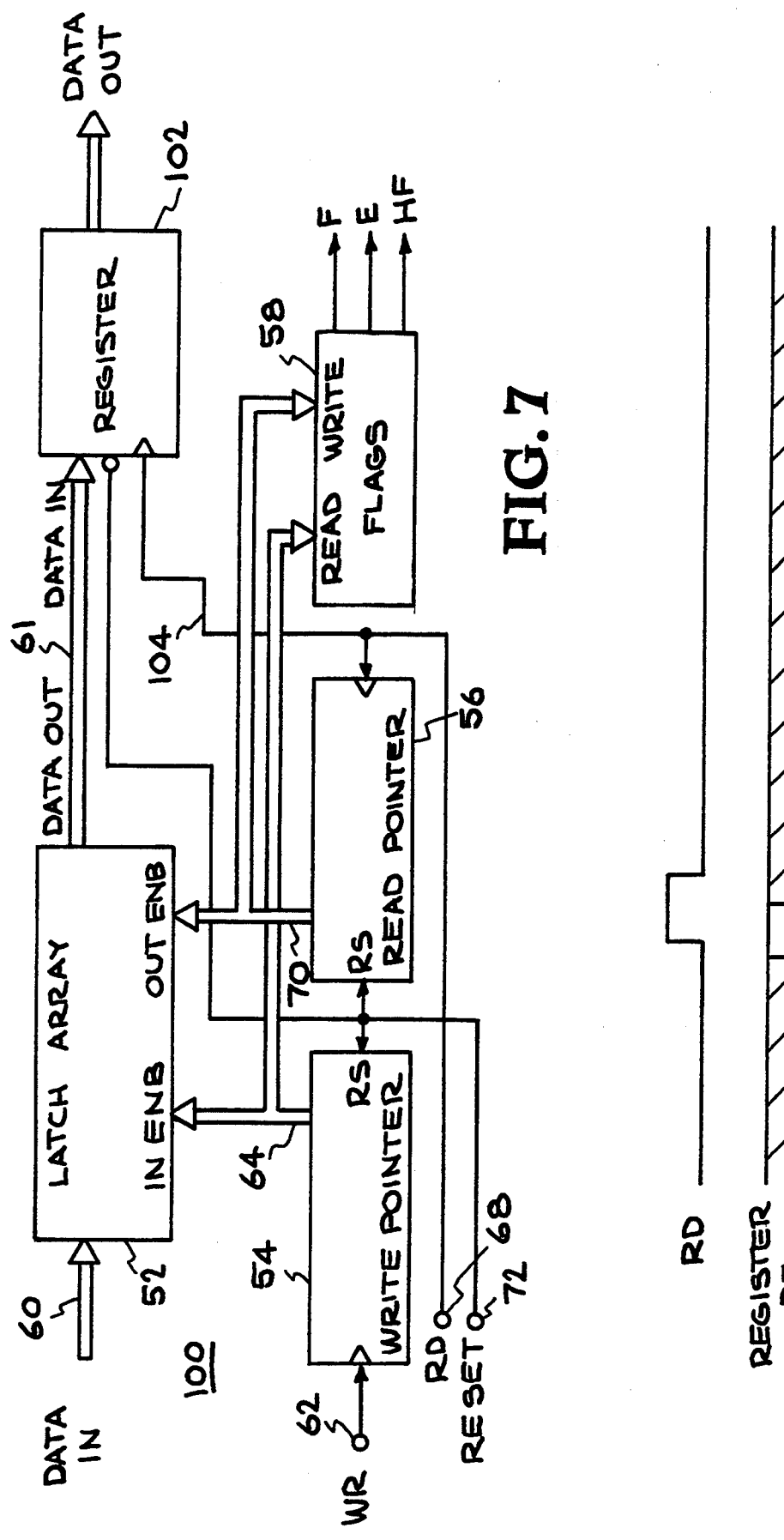
FIG. 7 is a block diagram of a FIFO memory circuit which has a register at the output of a memory latch-array, according to the invention.

FIG. 7 is a block diagram of an n-bit wide FIFO memory system 100, according to the invention. The system includes n-bit wide elements similar to that of FIG. 5, that is, a memory latch-array 52, a write-pointer logic circuit 54, a read-pointer logic circuit 56, and a flag logic circuit 58. In addition, a register 102 is provided for increasing the speed of operation of the system. Similar reference numerals are used in FIGS. 5 and 7 for similar system elements.

The memory latch-array 52 is for temporarily storing a series of n-bit wide data words, where each bit of the words is stored in a latch array 10 such as illustrated in FIG. 1. N-bit wide input words are provided to the input terminals of the latch array 52 using a n-bit wide data bus 60. Output data from the latch arry 52 is provided on an n-bit wide output data bus 62.

The write-pointer logic circuit 54 receives a write command WR signal at an input terminal 62. Write pointers, or address signals pointing to a location in the latch array 52, are provided from the write pointer logic circuit 54 on one branch of a signal bus 64 to the write-enable terminals IN ENB of the latch array 52 to select the storage location for storage of an input data word. The write pointers from the write-pointer logic circuit 54 are also provided on another branch of the signal bus 64 to the write input terminals of the flag logic circuit 58.

Similarly, the read-pointer logic circuit 56 receives an a read command RD signal at an input terminal 68. Read pointers, or address signals pointing to a location in the latch array 52, are provided from the read-pointer logic circuit 56 on one branch of a signal bus 70 to the read-enable terminals OUT ENB of the latch array 52 to select the storage location for reading out a data word to the n-bit wide output data bus 62. The read pointers from the read-pointer logic circuit 56 are also provided on another branch of the signal bus 70 to the read input terminals of the flag logic circuit 58.

The flag logic circuit 58 receives the write and read pointer signals on the respective buses 64, 70 and provides logic output signals for full F, empty E, and half-full HF conditions of the latch array 52. The write-pointer logic 54 and the read-pointer logic 56 have reset terminals RS which receive a reset signal from a reset terminal 72 to reset the pointer to their initial values, indicating an empty latch array 52.

Register array 102 is provided for increasing the speed of operation of the system. The register array receives at its respective data-input terminals the corresponding ones of the n-bits from the data out bus 62 of the latch array 52. The read pulse signal RD provided at input terminal 68 of the system is also provided on a signal line 104 to a clock input terminal of the register 102.

Figure 8:
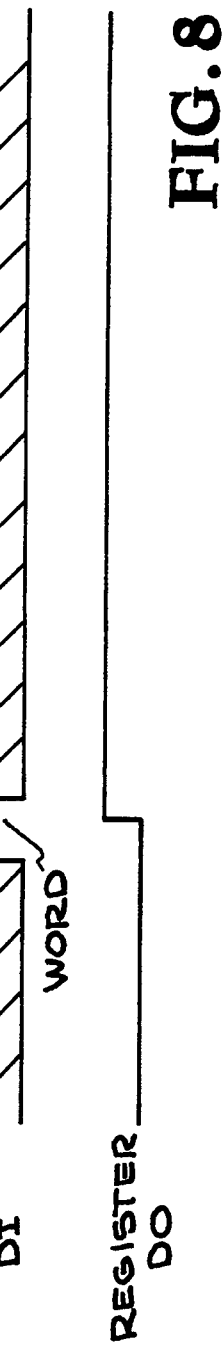
FIG. 8 is a timing chart for the FIFO memory circuit of FIG. 7.

FIG. 8 is a timing chart for the FIFO memory system of FIG. 7. In this system, the read pointer has been previously set so that the proper memory locations have already been addressed and the data out FIFO DO signals already appear on the n-bit wide output data bus 62 from the latch array 52. For a read operation, the leading edge of the RD signal clocks the register 102 to transfer the input signals (Register DI) on the input terminals of the register 102 to the output terminals of the register 102 as the Register DO signals. The delay time is only that of the register 102, which is, for example, on the order of 2 nanoseconds. Compare this to the 20 nanosecond delay for the conventional FIFO system of FIG. 5.

For a write operation, the system shown in FIG. 7 performs like the system shown in FIG. 5.

Figure 9:
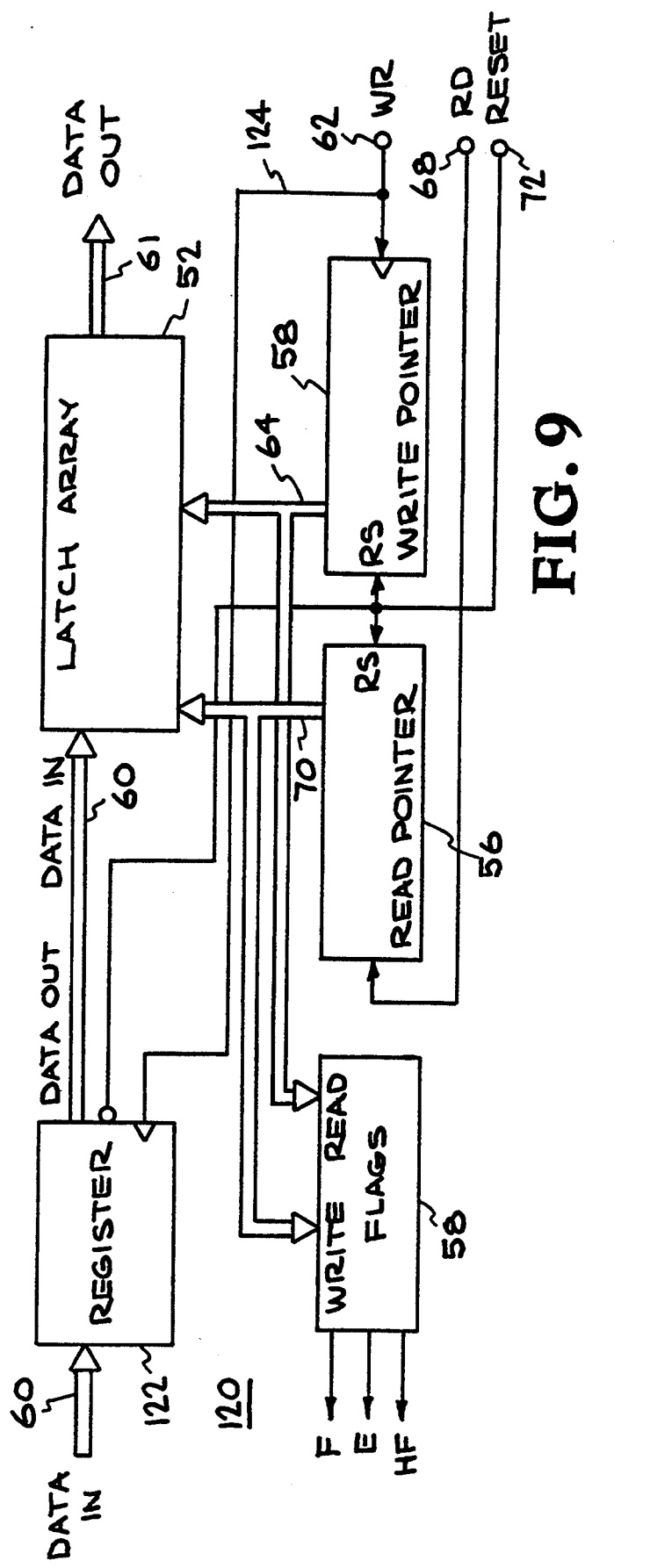
FIG. 9 is a block diagram of a FIFO memory circuit which has an input register connected in series with the the input terminals of a memory latch-array, according to the invention.

FIG. 9 is a block diagram of a FIFO memory system 120 which uses an input register 122 to assist in writing information into the latch array 52, according to the invention. The system includes elements similar to that of FIG. 5, that is, a memory latch-array 52, a write-pointer logic circuit 54, a read-pointer logic circuit 56, and a flag logic circuit 58. In addition, the register 122 is provided for increasing the speed of operation of the system. The write pulse signal WR is provided on a signal line 124 to the clock input terminal of the register 122. Similar reference numerals are used in FIGS. 5, 7, and 9 for similar system elements.

Figure 10:
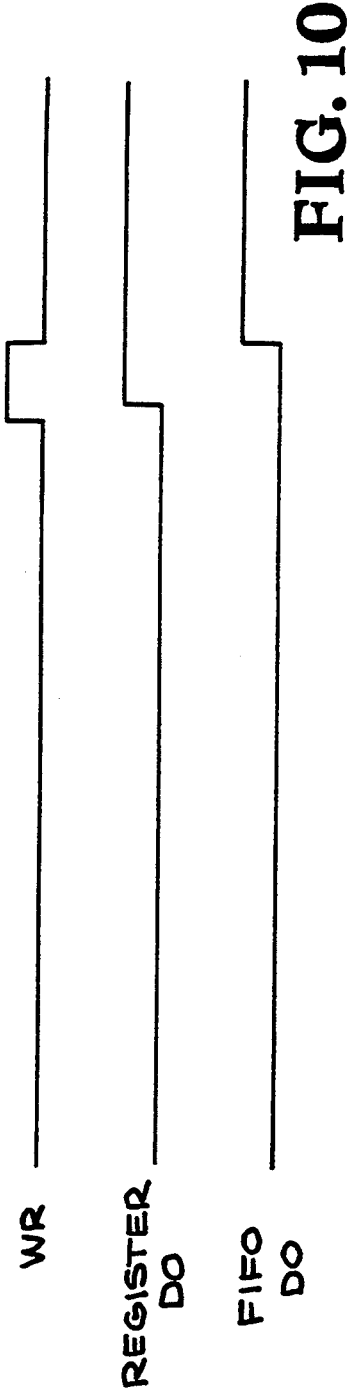
FIG. 10 is a timing chart for the FIFO memory circuit of FIG. 9.

FIG. 10 is a timing chart for the FIFO memory circuit of FIG. 9. The leading edge of the write signal WR captures the data in signal from the bus 60. After a short time delay, that data appears at the output terminal of the register 122 as signal REGISTER DO. The data appears at the output of the latch array 52 as the FIFO DO signal on the bus 62. Compare this to the time delay needed for the OUTPUT READY signal of FIG. 6, which has a delay equal to the time required to activate the write-pointer logic 54 and the time to latch the data input signal into the latch array 52.

The output register 102 of FIG. 7 and the input register 122 of FIG. 9 enhance the speed at which data is available to and from a FIFO system according to the invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

It is claimed:

1. An improved first-in/first-out (FIFO) memory circuit, comprising:

FIFO data-storage means for storing data information in a group of memory locations, said data-storage means having a first data-input terminal and a data output terminal wherein the FIFO data-storage means includes a series of latches, each latch having a second data-input terminal connected in parallel to said second data input terminals of the other latches, each of said latches having a tri-state data-output terminal connected to said data output terminal of the data-storage means, each of said latches having an input enable terminal for transferring input data from said second data input terminal to said tri-state data output terminal;

write-pointer logic means coupled to said data storage means for selecting the next-available one of said memory locations into which the next available data is to be written;

read-pointer logic means coupled to said data storage means for providing an address signal to a predetermined first-in memory location of the data-storage means to thereby provide the first-in data of the predetermined memory location at the data output terminal of the data-storage means;

output storage means having a single input terminal connected to the output terminal of said data-storage means, said output storage means having an output terminal, said output storage means having a clock terminal for receiving a read clock signal for transferring the data state of the data location containing the first-in data provided from the data-storage means selected by the read-pointer logic means to the output terminal of said output storage means, wherein said output storage means includes a single register having an input terminal connected to the output terminal of said data-storage means.

2. The FIFO memory circuit of claim 1 including status logic means for indicating the availability of storage locations within the FIFO data-storage means.

3. The FIFO memory circuit of claim 2 wherein the status logic means provides full and empty status flags.

4. The FIFO memory circuit of claim 1 wherein the write-pointer logic means includes a series of serially-connected shift registers having output terminals for providing respective pointer signals for each of said memory locations of the data-storage means.

5. The FIFO memory circuit of claim 1 wherein the read-pointer logic means includes a counter and decoding logic, the output terminal of which are for providing respective pointers for each of the memory locations of the data-storage means.

6. The FIFO memory circuit of claim 1 including input register means for storing input signals to said data-storage means, said input register means having an input terminal for receiving input data and said input register means having an output terminal coupled to the input terminal of said data-storage means, said input register means having a clock terminal for receiving a write clock signal for transferring said input data at the input terminal of the input register means to the output terminal of said input register means and to the input terminal of the data-storage means.

* * * * *